US011023607B1

(12) United States Patent
Mantin et al.

(10) Patent No.: US 11,023,607 B1
(45) Date of Patent: Jun. 1, 2021

(54) DETECTING BEHAVIORAL ANOMALIES IN USER-DATA ACCESS LOGS

(71) Applicant: Imperva, Inc., San Mateo, CA (US)

(72) Inventors: Itsik Mantin, Shoham (IL); Craig Burlingame, Mounds View, MN (US); Brian Anderson, San Diego, CA (US); Kunal Anand, Los Angeles, CA (US); Ran Rosin, Ramat Hasharon (IL); Peter Klimek, Seattle, WA (US); Joseph Moore, San Diego, CA (US)

(73) Assignee: Imperva, Inc., San Mateo, CA (US)

( * ) Notice: Subject to any disclaimer, the term of this patent is extended or adjusted under 35 U.S.C. 154(b) by 0 days.

(21) Appl. No.: 15/929,252

(22) Filed: Apr. 3, 2020

(51) Int. Cl.
*G06F 21/62* (2013.01)
*G06F 16/23* (2019.01)

(52) U.S. Cl.
CPC ...... *G06F 21/6218* (2013.01); *G06F 16/2365* (2019.01)

(58) Field of Classification Search
CPC .......................... G06F 21/6218; G06F 16/2365
USPC ........................................................ 707/781
See application file for complete search history.

(56) References Cited

U.S. PATENT DOCUMENTS

| 9,210,183 | B2* | 12/2015 | Sadovsky | G06Q 20/4016 |
|---|---|---|---|---|
| 10,331,898 | B2* | 6/2019 | Nefedov | G06F 21/604 |
| 10,663,961 | B2* | 5/2020 | Spiro | G05B 23/0272 |
| 2008/0243524 | A1* | 10/2008 | Agrawal | G06Q 10/10 |
| | | | | 705/1.1 |
| 2009/0106433 | A1* | 4/2009 | Knouse | H04L 67/14 |
| | | | | 709/229 |
| 2010/0318858 | A1* | 12/2010 | Essawi | G06F 16/21 |
| | | | | 714/49 |

OTHER PUBLICATIONS

Sallam, Asmaa, et al., "Techniques and Systems for Anomaly Detection", PADG 2018, LNCS 11550, © Springer Nature Switzerland AG, 2019, pp. 113-133.*

Chandola, Varun, et al., "Anomaly Detection: A Survey", ACM Computing Surveys, vol. 41, No. 3, Article 15, Jul. 2009, pp. 15:1-15:58.*

(Continued)

*Primary Examiner* — Robert Stevens
(74) *Attorney, Agent, or Firm* — Nicholson De Vos Webster & Elliott LLP

(57) ABSTRACT

A method for detecting anomalies in audit logs of database operations performed on databases. The method includes obtaining a first audit log of database operations performed on one or more databases, generating, for each of a plurality of attribute values associated with a designated attribute appearing in the first audit log, a profile of that attribute value that indicates expected attribute characteristics of one or more attributes when that attribute value is associated with the designated attribute, obtaining a second audit log of further database operations performed on the one or more databases, and detecting an anomaly responsive to a determination that a log entry in the second audit log includes an attribute value associated with the designated attribute but attributes in the log entry deviate from the expected attribute characteristics of the one or more attributes indicated by the profile of the attribute value associated with the designated attribute.

20 Claims, 6 Drawing Sheets

(56) References Cited

OTHER PUBLICATIONS

Sallam, Asmaa, et al., "Detection and syntax centric anomaly detection for relational databases", WIREs Data Mining and Knowledge Discovery, vol. 6, Nov./Dec. 2016, John Wiley & Sons, Ltd., pp. 231-239.*

Kunal Anand et al., "Capturing Contextual Information for Data Accesses to Improve Data Security," U.S. Appl. No. 16/730,993, filed Dec. 30, 2019, 35 pages.

Imperva, "Database Activity Monitoring User Guide," v13.5, Aug. 28, 2019, pp. 1-65.

* cited by examiner

DETECTING BEHAVIORAL ANOMALIES IN USER-DATA ACCESS LOGS

TECHNICAL FIELD

Embodiments of the invention relate to the field of database security, and more specifically, to detecting anomalies in audit logs of database operations performed on databases.

BACKGROUND ART

Database servers are computer programs that provide database services to database clients. Many web applications utilize database servers (e.g., database servers that host relational databases to store information received from Hypertext Transfer Protocol (HTTP) clients and/or information to be displayed to HTTP clients). However, other non-web applications may also utilize database servers, including but not limited to accounting software, other business software, or research software. Further, some applications allow for users to submit ad-hoc or defined queries (often using Structured Query Language (SQL)) to the database server. Database servers typically store data using one or more databases. Thus, in some instances a database server can receive a database query from a database client, execute the database query using data stored in the set of one or more database objects (e.g., a table in a relational database) of one or more of the databases, and may potentially return a result (e.g., an indication of success, a value, one or more tuples, etc.).

Databases may be implemented according to a variety of different database models, such as relational (such as PostgreSQL, MySQL, and certain Oracle® products), non-relational, graph, columnar (also known as extensible record; e.g., HBase), object, tabular, tuple store, and multi-model. Examples of non-relational database models (which are also referred to as schema-less and NoSQL) include key-value store and document store (also known as document-oriented as they store document-oriented information, which is also known as semi-structured data). A database may include one or more database objects that are managed by a Database Management System (DBMS). Each database object may include a number of records, and each record may include a set of fields. A record may take different forms based on the database model being used and/or the specific database object to which it belongs; for example, a record may be: 1) a row in a table of a relational database; 2) a JavaScript Object Notation (JSON) document; 3) an Extensible Markup Language (XML) document; 4) a key-value pair; etc. A database object can be unstructured or have a structure defined by the DBMS (a standard database object) and/or defined by a user (custom database object). In the case of relational databases, each database typically includes one or more database tables (traditionally and formally referred to as "relations"), which are ledger-style (or spreadsheet-style) data structures including columns and rows of data adhering to any defined data types for each column.

Enterprises (e.g., businesses, organizations, groups, governmental bodies, or other collective bodies) often use databases to store various data pertaining to those enterprises, some of which may be highly sensitive (e.g., credit card numbers, social security numbers, etc.). An enterprise may use database activity monitoring techniques to monitor the activity of its databases. An enterprise may want to monitor database activity for several reasons. For example, an enterprise may want to monitor database activity to meet regulations and compliance standards for sensitive data accesses, to help with security incident investigations and incident responses, and/or to detect anomalous data accesses.

Database activity monitoring techniques may be used to generate audit logs of the database operations performed on a set of databases. These audit logs may include various information regarding the database operations made on the databases such as the database on which a database operation was performed, the database object (e.g., database table) on which a database operation was performed, the type of database operation performed (e.g., SELECT, UPDATE, DELETE, INSERT INTO, etc.), the number of records (e.g., rows) affected by a database operation, the type of data affected by a database operation (e.g., credit card data, social security number, name, surname, mail address, zip code, etc.), and/or the database query that was executed. In some cases, application users interact with an application (e.g., a web application or web application programming interface (API)) to cause the application to perform database operations on databases. In these cases, database operations may be recorded in the audit logs as being made by the application itself (e.g., the service account associated with the application), without identifying the application users behind the application that caused those database operations to be performed. Some database activity monitoring techniques are able to identify which application users caused which database operations to be performed on the databases (e.g., based on performing statistical correlations between the application traffic and the database traffic or other means), and include this information in the audit logs, thereby providing user accountability. Also, some database activity monitoring techniques are able to identify which function of the application (e.g., which may correspond to a uniform resource locator (URL) (in the case of web applications and web APIs) or a portion of application code) caused which database operations to be performed on the databases, and include this information in the audit logs.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
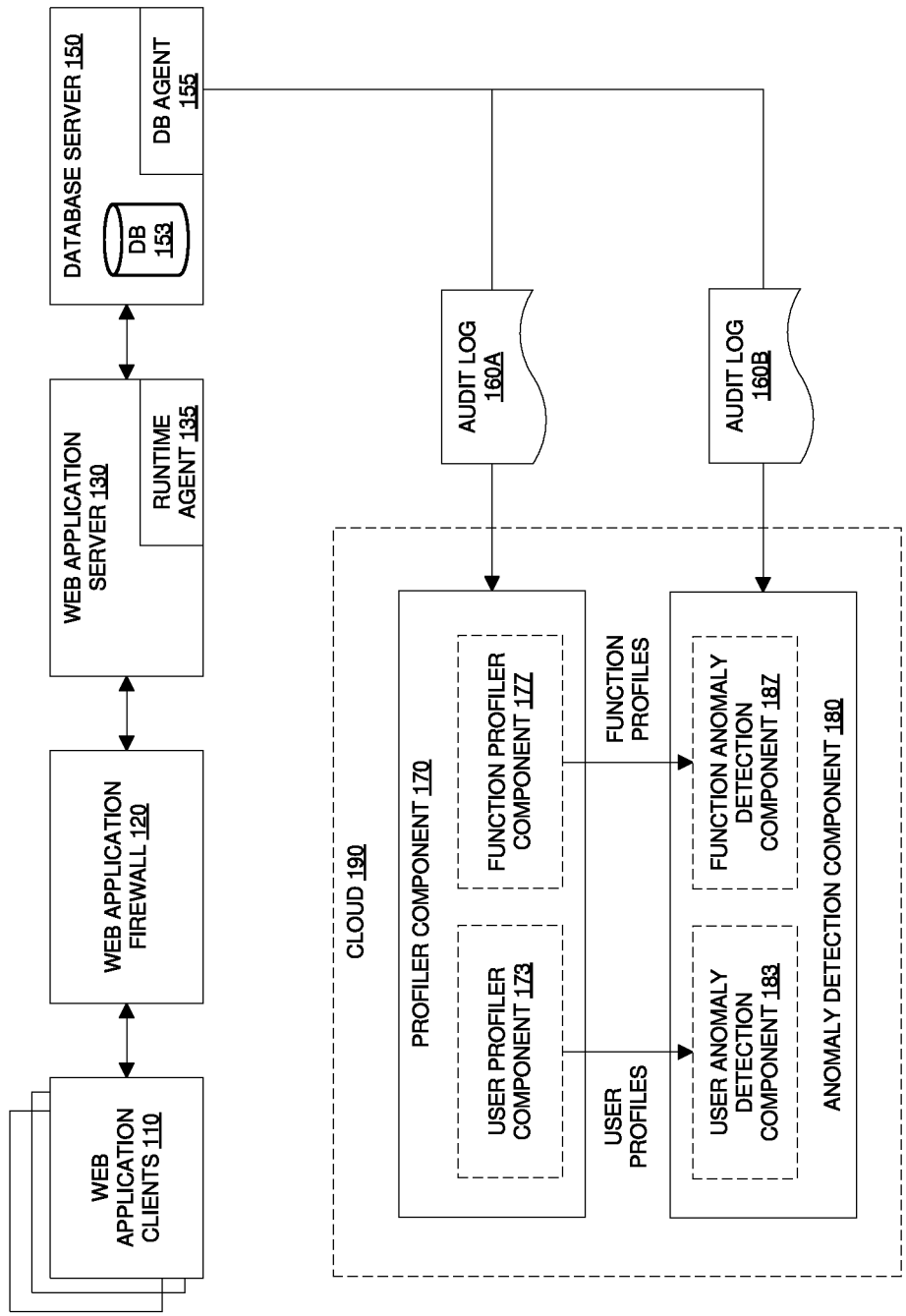
FIG. 1 is a block diagram illustrating a system in which anomalies can be detected in audit logs, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As used herein, server end stations are network devices operable to execute or otherwise implement one or more servers providing content or services to clients. For example, server end stations may implement web application servers, application programming interface (API) servers, database servers, file servers, print servers, mail servers, gaming servers, application servers, and/or Domain Name System (DNS) servers.

As used herein, client end stations (e.g., workstations, laptops, netbooks, palm tops, mobile phones, smartphones, multimedia phones, Voice over Internet Protocol (VoIP) phones, user equipment (UE), terminals, portable media players, Global Positioning Satellite (GPS) units, gaming systems, set-top boxes) are network devices operable to execute or otherwise implement applications that, among other functions, can access the content and/or services provided by servers over a network (e.g., over a local area network (LAN), over the Internet, and/or over virtual private networks (VPNs) overlaid on (e.g., tunneled through) the Internet).

A web application server is system software (e.g., running on top of an operating system) executed by server hardware upon which web applications run. Web application servers may include a web server (e.g. Apache, Microsoft® Internet Information Server (IIS), nginx, lighttpd), which delivers web pages on the request of web application clients (e.g., HyperText Transfer Protocol (HTTP) clients using HTTP), and may also include an application server that executes procedures (i.e., programs, routines, scripts) of a web application. Web applications are computer software applications made up of one or more files including computer code that can run on top of web application servers and are written in a language the web application server supports. Web applications are typically designed to dynamically generate web application layer responses (e.g., HTTP response messages) responsive to web application layer requests (e.g., HTTP request messages) sent by web application clients.

Web applications clients access web applications by sending web application layer requests to web application servers, which execute portions of web applications and return web application data/content (e.g., HyperText Markup Language (HTML) page) in the form of web application layer responses (e.g., HTTP response messages) back to the web application clients, where the web application data/content may be rendered by the web application clients. The web application data/content may include, for example, public web pages (e.g., free content, store fronts, search services) and/or private web pages (e.g., username/password accessed web pages providing email services). Thus, web applications may be provided using a request-response protocol (e.g., HTTP) in a client-server computing model, where the web application servers typically act as the "server" and the web application clients typically act as the "client."

By way of an operational example, a web application client may request a web page from a web application server by sending it an HTTP request message. For example, to access the web page corresponding to the Uniform Resource Locator (URL) of "http://www.example.org/index.html", the web browser may connect to the web application server at www.example.org by sending it an HTTP request message using a "GET" method, which may look like the following:
GET/index.html HTTP/1.1
Host: www.example.org The web application server may reply by sending a set of HTTP headers along with the requested web page, which collectively is called an HTTP response message.

As mentioned above, database activity monitoring techniques may be used to generate audit logs of the database operations performed on a set of databases. These audit logs may include various information regarding the database operations made on the databases such as the database on which a database operation was performed, the database object (e.g., database table) on which a database operation was performed, the type of database operation performed (e.g., SELECT, UPDATE, DELETE, INSERT INTO, etc.), the number of records (e.g., rows) affected by a database operation, the type of data affected by a database operation (e.g., credit card data, social security number, name, surname, mail address, zip code, etc.), and/or the database query that was executed. In some cases, application users interact with an application (e.g., a web application or web application programming interface (API)) to cause the application to perform database operations on databases. In these cases, database operations may be recorded in the audit logs as being made by the application itself (e.g., the service account associated with the application), without identifying the application users behind the application that caused those database operations to be performed. Some database activity monitoring techniques are able to identify which application users caused which database operations to be performed on the databases (e.g., based on performing statistical correlations between the application traffic and the database traffic or other means), and include this information in the audit logs, thereby providing user accountability. Also, some database activity monitoring techniques are able to identify which function of the application (e.g., which may correspond to a uniform resource locator (URL) (in the case of web applications and web APIs) or a portion of application code) caused which database operations to be performed on the databases, and include this information in the audit logs.

With the ever-increasing amount and types of information included in audit logs, it is becoming increasingly complex to analyze audit logs and to detect anomalies in the audit logs (e.g., which may be indicative of suspicious or malicious behavior). Embodiments provide an effective framework for automatically detecting anomalies in audit logs.

Embodiments may obtain an audit log of database operations performed on one or more databases and generate profiles for different attribute values associated with a designated attribute appearing in the audit logs. The profile of a given attribute value may indicate the expected attribute characteristics of one or more attributes other than the designated attribute when the given attribute value is associated with the designated attribute. In one embodiment, the designated attribute is an application user attribute that is used for indicating an application user of an application that caused a database operation to be performed. In such an embodiment, a profile may be generated for each of one or more application users indicated by the application user attribute appearing in the audit log, where the profile of a given application user indicates the expected attribute characteristics of one or more attributes (other than the application user attribute) when the given application user is indicated by the application user attribute as being the application user that caused a database operation to be performed. The expected attribute characteristics may indicate whether attribute values for certain attributes are expected to exist (or not) and/or the expected values of certain attributes. Additionally or alternatively, in one embodiment, the designated attribute is a function attribute that is used for indicating a function of an application that caused a database operation to be performed. In such an embodiment, a profile may be generated for each of one or more functions indicated by the function attribute appearing in the audit log, where the profile of a given function indicates the expected attribute characteristics of one or more attributes (other than the function attribute) when the given function is indicated by the function attribute as being the function that caused a database operation to be performed.

Embodiments may use the generated profiles to detect anomalies in future audit logs. An anomaly may be detected in an audit log in response to a determination that a log entry in that audit log includes a given attribute value associated with the designated attribute but attributes (other than the designated attribute) in the log entry deviate from the expected attribute characteristics indicated by the profile of the given attribute value. For example, in an embodiment where the designated attribute is the application user attribute, the profile of a given application user may indicate that an attribute value associated with a given attribute is expected to exist. An anomaly may be detected if the application user attribute in a log entry indicates that the given application user caused a database operation to be performed but an attribute value associated with the given attribute indicated by the profile of the given application user does not exist in the log entry. As another example, in an embodiment where the designated attribute is the function attribute, the profile of a given function may indicate that the expected value for a given attribute is one of multiple possible attribute values. An anomaly may be detected if the function attribute in a log entry indicates that the given function caused a database operation to be performed but the attribute value associated with the given attribute is not one of the multiple possible attribute values indicated by the profile of the given function. A technical advantage of the anomaly detection framework disclosed herein is that it allows anomaly detection to be performed from a chosen perspective or even multiple perspectives. For example, anomaly detection can be performed with respect to application user behavior (e.g., by setting the application user attribute as the designated attribute) and/or with respect to function behavior (e.g., by setting the function attribute as the designated attribute). Embodiments are further described herein below with reference to the accompanying figures.

FIG. 1 is a block diagram illustrating a system in which anomalies can be detected in audit logs, according to some embodiments. As shown in the diagram, the system includes web application clients 110, a web application firewall 120, a web application server 130, a database server 150, a profiler component 170, and an anomaly detection component 180. In one embodiment, the profiler component 170 and/or the anomaly detection component 180 are/is implemented in a cloud 190. However, in other embodiments, these components may be implemented elsewhere (e.g., in the database server 150 or a security information and event monitoring (SIEM) component (not shown)).

The web application clients 110 may access a web application implemented by the web application server 130, for example, by generating one or more web application layer requests (e.g., Hypertext Transfer Protocol (HTTP) request messages such as a "POST" HTTP request messages or "GET" HTTP request messages) and sending these web application layer requests to the web application server 130. In response to receiving web application layer requests, the web application server 130 may send corresponding web application layer responses (e.g., HTTP response messages) containing the data/content of the web application (e.g., which may be retrieved from the database 153) to the web application clients 110. The respective web application clients 110 may then render the data/contents of the web application layer responses (e.g., on a display screen for an end user) or otherwise use the data/contents of the web application layer responses. Each of the web application clients 110 may be implemented by a client end station and the web application server 130 may be implemented by one or more server end stations.

The web application server 130 may implement a web application that is made accessible to the web application clients 110. As shown in the diagram, the web application server 130 includes a runtime agent 135 that provides runtime application self-protection (RASP) functionality for the web application implemented by the web application server 130. RASP (RASP) is a security technology that uses runtime instrumentation to detect and block attacks by taking advantage of information from inside the running software. This technology differs from perimeter-based protections such as firewalls that detect and block attacks using network-based information and that have minimal or no contextual awareness with regard to the application state/context. The runtime agent 135 may be a RASP plug-in that is integrated as a framework or module that executes in conjunction with application code. Because the runtime agent 135 is integrated into the application code (e.g., the code of the web application) or otherwise tightly integrated with the application code, the runtime agent 135 may have access to information regarding the execution state of the application or other contextual information such as the username of the application user that is logged in to the web application, the function of the web application that is submitting database queries to the database server 150, and information regarding the database queries being submitted by the web application to the database server 150 (e.g., the name of the databases being accessed, the names of the database tables being accessed, etc.).

The web application firewall 120 is communicatively coupled between the web application clients 110 and the web application server 130 to protect the web application server 130 from attacks by the web application clients 110. The web application firewall 120 may sit inline to the traffic being sent between the web application clients 110 and the web application server 130 such that it can see the traffic being sent between them. The web application firewall 120 may perform security analysis of the traffic being sent between the web application clients 110 and the web application server 130, which may involve analyzing traffic (e.g., packets) being sent to the web application server 130 to determine whether the traffic should be allowed to continue traveling through the network to the web application server 130. If the web application firewall 120 detects malicious traffic, it may perform a security response such as preventing the malicious traffic from reaching the protected web application server 130, modifying the malicious traffic (e.g., sanitize it so that it is no longer poses a threat), and/or generating an alert to trigger another responsive event or notify an administrator of the detection of malicious traffic. The web application firewall 120 may protect the web application server 130 against a variety of attacks from the web application clients including, but not limited to, Structured Query Language injection (SQLi) attacks, Cross-Site Request Forgery (CSRF) attacks, and Remote File Inclusion (RFI) Attacks (e.g., based on applying security rules). In addition to protecting the web application server 130 against web application attacks, the web application firewall 120 may provide various other functionality depending on the implementation such as content caching, traffic scrubbing, Internet Protocol (IP) address masking, and/or load balancing. The web application layer firewall 120 may be implemented by one or more network devices.

The web application firewall 120 may determine various information regarding the web application layer requests it sees to help it detect malicious web application layer requests. This information may include whether the web application layer request was generated by a human or a bot, the source IP address associated with the web application layer request, the reputation score of the source IP address associated with the web application layer request, the client type (e.g., the browser being used to access the web application) of the web application client that generated the web application layer request, and the geolocation from which the web application layer request originated.

The database server 150 hosts a database 153 and provides database clients with access to the database 153. As shown in the diagram, the database server 150 includes a database agent 155 for monitoring the database activity of the database 153. The database agent 155 (also sometimes referred to as a database activity monitoring (DAM) agent) is a piece of software typically installed locally to or close to the database 153 (e.g., in the database server 150 that hosts the database 153) that is configured to monitor the database activity of the database 153. The database agent 155 is typically implemented as a lightweight process to impose minimum overhead on the database server 150. The database agent 155 may perform minimal security analysis on the database traffic it sees and forward the database traffic (or relevant information about the database traffic) to a security analysis server (not shown) for a more in-depth analysis. The security analysis server can perform a more detailed analysis of the database traffic and make various security decisions based on its analysis of the database traffic (e.g., decide whether certain database traffic is suspicious and/or malicious and whether to block and/or generate alerts responsive to such database traffic). The database server 150 may be implemented by one or more network devices.

While the embodiment shown in the diagram uses a database agent 155 to monitor database traffic, other embodiments may utilize different types of database activity monitoring implementations to monitor database traffic. For example, a database activity monitoring gateway can be deployed in front of the database server 150 (that sits in-line to the traffic going to/from the database server 150) to monitor database traffic going to/from the database server 150. As another example, a non-in-line sniffer can be deployed to monitor the database traffic. Also, while the diagram shows the database server 150 hosting a single database 153, it should be understood that the database server 150 may host more than one database.

The database agent 155 (or other database activity monitoring component) may generate audit logs of database operations performed on the database 153. An audit log may include multiple log entries, where each log entry includes multiple attribute values each associated with different attributes. Each attribute may be used for indicating certain information regarding a database operation performed on the database 153. An audit log may include information determined by the database agent 155 itself and may also include contextual information gathered/determined by the web application firewall 120 and/or the runtime agent 135. A technique for generating audit logs with contextual information is described in U.S. patent application Ser. No. 16/730,993 (titled "Capturing Contextual Information for Data Access to Improve Security" filed on Dec. 30, 2019), which is hereby incorporated by reference. While the diagram shows a web application context (a system that includes web application clients 110, a web application server 130, and a web application firewall 120), the audit log anomaly detection techniques disclosed herein can also be implemented in non-web application contexts.

As a non-limiting example, a log entry of an audit log may include one or more of the following attributes: a data type attribute that is used for indicating the type of data affected by a database operation, a number of extracted entries attribute that is used for indicating the number of entries/records/rows extracted by a database operation, a number of manipulated entries attribute that is used for indicating the number of entries/records/rows manipulated (i.e., changed) by a database operation, a stack trace information attribute that is used for indicating stack trace information of an application (e.g., which code was executed prior to the currently executed code) that caused a database operation to be performed, a stack line attribute that is used for indicating a stack line of an application (e.g., the line of the executed code) that caused a database operation to be performed, a function attribute that is used for indicating a function of an application that caused a database operation to be performed (e.g., which may correspond to a URL or a collection of URLs that can be used to access a web application or correspond to a code segment of an application), a params attribute that is used for indicating parameters included in a web application layer request that caused a database operation to be performed, a headers attribute for indicating header information included in a web application layer request that caused a database operation to be performed, a domain attribute for indicating a domain name to which a web application layer request that caused a database operation to be performed is sent, an application user attribute that is used for indicating an application user of an application that caused a database operation to be performed, a session info attribute that is used for indicating session information (e.g., an authentication token), a user-agent attribute that is used for indicating the user-agent that caused a database operation to be performed, a tool classification attribute that is used for indicating the type of tool that caused a database operation to be performed, a database attribute that is used for indicating a database on which a database operation was performed, a database table attribute that is used for indicating the database table on which a database operation was performed, a database operation attribute that is used for indicating the database operation performed (e.g., SELECT, INSERT, UPDATE, CREATE TABLE, etc.), a database operation type attribute that is used for indicating the type of database operation performed (e.g., database operations may be grouped into database operation types (e.g, data manipulation type (such as INSERT and UPDATE), data declaration type (e.g., CREATE TABLE), and data extraction type (e.g., SELECT))), a query attribute that is used for indicating the database query that caused a database operation to be performed.

As shown in the diagram, the database agent 155 may provide audit log 160A to the profiler component 170. The profiler component 170 may generate profiles for different attribute values associated with a designated attribute appearing in audit log 160A. The profile of a given attribute value may indicate the expected attribute characteristics of one or more attributes other than the designated attribute when the given attribute value is associated with the designated attribute. In one embodiment, the designated attribute is an application user attribute that is used for indicating an application user of an application that caused a database operation to be performed. In such an embodiment, the profiler component 170 may include a user profiler component 173 that generates a profile for each of one or more application users indicated by the application user attribute appearing in audit log 160A, where the profile of a given application user indicates the expected attribute characteristics of one or more attributes (other than the application user attribute) when the given application user is indicated by the application user attribute as being the application user that caused a database operation to be performed. The expected attribute characteristics may indicate whether attribute values for certain attributes are expected to exist (or not) and/or the expected values of certain attributes.

Additionally or alternatively, in one embodiment, the designated attribute is a function attribute that is used for indicating a function of an application that caused a database operation to be performed. In such an embodiment, the profiler component 170 may include a function profiler component 177 that generates a profile for each of one or more functions indicated by the function attribute appearing in audit log 160A, where the profile of a given function indicates the expected attribute characteristics of one or more attributes (other than the function attribute) when the given function is indicated by the function attribute as being the function that caused a database operation to be performed. The expected attribute characteristics may indicate whether attribute values for certain attributes are expected to exist (or not) and/or the expected values of certain attributes. For purposes of illustration only, embodiments will primarily be described in a context where the designated attribute is an application user attribute and/or a function attribute. It should be understood, however, that the invention is not so limited, and that the audit log anomaly detection techniques disclosed herein can be applied using different designated attributes. Also, in some embodiments, the designated attribute may be a combination of attributes (e.g., a combination of the application user attribute and a user-agent attribute).

In one embodiment, the profiler component 170 generates profiles for different attribute values associated with a designated attribute appearing in audit log 160A based on learning instructions. The learning instructions may indicate a learning type for each of one or more attributes (other than the designated attribute). The learning type for an attribute indicates how the expected characteristic of the attribute is to be learned. In one embodiment, the learning type may be any one of an existence learning type, an existence each learning type, a single learning type, a multiple learning type, and a numeric range learning type.

The existence learning type indicates that the profiler component 170 should learn whether an attribute value associated with a given attribute is expected exist (or not) without regard to the actual value itself. The existence each learning type indicates that the profiler component 170 should learn the set of keys/parameters that are expected to be included (and/or not included) in an attribute value associated with a given attribute (e.g., this learning type is useful for attributes that are expected to have attribute values having a dictionary structure (e.g., key-value pairs) (e.g., a list of parameters and corresponding parameter values or a list of cookies and cookie values). The single learning type indicates that the profiler component 170 should learn a single expected attribute value associated with a given attribute. The multiple learning type indicates that the profiler component 170 should learn multiple expected attribute values associated with a given attribute. The numeric range learning type indicates that the profiler component 170 should learn an expected numeric range for attribute values associated with a given attribute.

For example, the user profiler component 173 may generate a profile for a given application user based on user learning instructions, where the user learning instructions indicate the learning type for each of one or more attributes. If the user learning instructions indicate that the learning type for a given attribute is the existence learning type, then the user profiler component 173 may analyze audit log 160A to learn whether an attribute value associated with the given attribute is expected to exist (without regard the actual value itself) when the given application user is indicated by the application user attribute as being the application user that caused a database operation to be performed. The user profiler component 173 may determine that an attribute value associated with the given attribute is expected to exist if more than a threshold percentage (e.g., 80 percent) of log entries in audit log 160A include an attribute value associated with the given attribute when the given application user is indicated by the application user attribute as being the application user that caused a database operation to be performed. Similarly, the user profiler component 173 may determine that an attribute value associated with the given attribute is not expected to exist if more than a threshold percentage of log entries in audit log 160A do not include an attribute value associated with the given attribute when the given application user is indicated by the application user attribute as being the application user that caused a database operation to be performed.

If the user learning instructions indicate that the learning type for a given attribute is the existence each learning type, then the user profiler component 173 may analyze audit log 160A to learn the set of keys/parameters that are expected to be included (and/or not included) in an attribute value associated with the given attribute when the given application user is indicated by the application user attribute as being the application user that caused a database operation to be performed. The existence each learning type may be useful for attributes that are expected to have attribute values having a dictionary structure (e.g., a list of parameters and corresponding parameter values or a list of cookies and corresponding cookie values).

If the user learning instructions indicate that the learning type for a given attribute is the single learning type, then the user profiler component 173 may analyze audit log 160A to learn a single expected attribute value associated with the given attribute when the given application user is indicated by the application user attribute as being the application user that caused a database operation to be performed. The user profiler component 173 may determine the single expected attribute value associated with the given attribute to be the attribute value that is most commonly associated with the given attribute in audit log 160A.

If the user learning instructions indicate that the learning type for a given attribute is the multiple learning type, then the user profiler component 173 may analyze audit log 160A to learn multiple expected attribute values associated with the given attribute when the given application user is indicated by the application user attribute as being the application user that caused a database operation to be performed. The user profiler component 173 may determine the multiple expected attribute values to be the attribute values that are most commonly associated with the given attribute in audit log 160A.

If the user learning instructions indicate that the learning type for a given attribute is the numeric range learning type, then the user profiler component 173 may analyze audit log 160A to learn the expected numeric range of attribute values associated with the given attribute when the given application user is indicated by the application user attribute as being the application user that caused a database operation to be performed. The user profiler component 173 may determine the expected numeric range of attribute values of the given attribute to be the numeric range starting from the lowest attribute value associated with the given attribute up to the highest attribute value associated with the given attribute (in some cases the beginning and/or end of the numeric range may be set lower/higher to allow for some buffer/leeway; also in some cases only one end of the range is required (e.g., only the high end of the range is required if being below the low end of the range is not interesting—this may be the case, for example, for the number of extracted entries attribute).

In this manner, the user profiler component 173 may use user learning instructions to generate a profile for each of one or more application users. For example, a profile of a given application user may indicate an expected attribute value for a database attribute or a database table name attribute (which indicates the databases or database tables that the given application user is expected to touch via an application), an expected attribute value for a database operation type attribute (which indicates the type of database operations that the given application user is expected to perform via an application), an expected attribute value for a number of extracted entries attribute or a number of manipulated entries attribute (which indicates the number of entries the given application user is expected to extract or manipulate via an application), and/or an expected attribute value for a function attribute (which indicates the functions of an application that the given application user is expected to touch).

As another example, the function profiler component 177 may generate a profile for a given function based on function learning instructions, where the function learning instructions indicate the learning type for each of one or more attributes. If the function learning instructions indicate that the learning type for a given attribute is the existence learning type, then the function profiler component 177 may analyze audit log 160A to learn whether an attribute value associated with the given attribute is expected to exist (without regard the actual value itself) when the given function is indicated by the function attribute as being the function that caused a database operation to be performed. The function profiler component 177 may determine that an attribute value associated with the given attribute is expected to exist if more than a threshold percentage (e.g., 80 percent) of log entries in audit log 160A include an attribute value associated with the given attribute when the given function is indicated by the function attribute as being the function that caused a database operation to be performed. Similarly, the function profiler component 177 may determine that an attribute value associated with the given attribute is not expected to exist if more than a threshold percentage of log entries in audit log 160A do not include an attribute value associated with the given attribute when the given function is indicated by the function attribute as being the function that caused a database operation to be performed.

If the function learning instructions indicate that the learning type for a given attribute is the existence each learning type, then the function profiler component 177 may analyze audit log 160A to learn the set of keys/parameters that are expected to be included (and/or not included) in an attribute value associated with the given attribute when the given function is indicated by the function attribute as being the function that caused a database operation to be performed. The existence each learning type may be useful for attributes that are expected to have attribute values having a dictionary structure (e.g., a list of parameters and corresponding parameter values or a list of cookies and corresponding cookie values).

If the function learning instructions indicate that the learning type for a given attribute is the single learning type, then the function profiler component 177 may analyze audit log 160A to learn a single expected attribute value associated with the given attribute when the given function is indicated by the function attribute as being the function that caused a database operation to be performed. The function profiler component 177 may determine the single expected attribute value associated with the attribute to be the attribute value that is most commonly associated with the given attribute in audit log 160A.

If the function learning instructions indicate that the learning type for a given attribute is the multiple learning type, then the function profiler component 177 may analyze audit log 160A to learn multiple expected attribute values associated with the given attribute when the given function is indicated by the function attribute as being the function that caused a database operation to be performed. The function profiler component 177 may determine the multiple expected attribute values to be the attribute values that are most commonly associated with the given attribute in audit log 160A.

If the function instructions indicate that the learning type for a given attribute is the numeric range learning type, then the function profiler component 177 may analyze audit log 160A to learn the expected numeric range of attribute values associated with the given attribute when the given function is indicated by the function attribute as being the function that caused a database operation to be performed. The function profiler component 177 may determine the expected numeric range of attribute values to be the numeric range starting from the lowest attribute value associated with the given attribute up to the highest attribute value associated with the given attribute (in some cases the beginning and/or end of the numeric range may be set lower/higher to allow for some buffer/leeway; also in some cases only one end of the range is required (e.g., only the high end of the range is required if being below the low end of the range is not interesting—this may be the case, for example, for the number of extracted entries attribute).

In this manner, the function profiler component 177 may use function learning instructions to generate a profile for each of one or more functions. For example, a profile of a given function may indicate an expected attribute value for a database attribute or a database table name attribute (which indicates the databases or database tables that the given function is expected to touch), an expected attribute value for a database operation type attribute (which indicates the type of database operations that the given function is expected to perform), an expected attribute value for a number of extracted entries attribute or a number of manipulated entries attribute (which indicates the number of entries the given function is expected to extract or manipulate), and/or an expected attribute value for an application user attribute (which indicates the application users that are expected to touch the given function).

While an embodiment has been described where the profiler component 170 generates profiles (e.g., user profiles or function profiles) based on particular learning instructions, in some embodiments the profiler component 180 may generate profiles using different learning instructions or without using learning instructions (e.g., using different learning/profiling techniques).

As shown in the diagram, the database agent 155 may provide audit log 160B to the anomaly detection component 180. The anomaly detection component 180 may use the profiles generated by the profiler component 170 to detect anomalies in audit log 160B. For example, the anomaly detection component 180 may detect an anomaly in audit log 160B in response to a determination that a log entry in audit log 160B includes an attribute value associated with the designated attribute but attributes in the log entry deviate from the expected attribute characteristics of the attributes indicated by the profile of the attribute value associated with the designated attribute. In an embodiment where the designated attribute is an application user attribute, the anomaly detection component 180 may include a user anomaly detection component 183 that uses user profiles generated/provided by the user profiler component 173 to detect anomalies in audit log 160B. Additionally or alternatively, in an embodiment where the designated attribute is a function attribute, the anomaly detection component 180 may include a function anomaly detection component 187 that uses function profiles generated/provided by the function profiler component 177 to detect anomalies in audit log 160B.

For example, if the profile of a given application user indicates that an attribute value associated with a given attribute is expected to exist, then the user anomaly detection component 183 may detect an anomaly if the application user attribute in a log entry indicates that the given application user caused a database operation to be performed but an attribute value associated with the given attribute indicated by the profile of the given application user does not exist in the log entry.

As another example, if the profile of a given application user indicates that a set of keys/parameters are expected to be included in an attribute value associated with a given attribute, then the user anomaly detection component 183 may detect an anomaly if the application user attribute in a log entry indicates that the given application user caused a database operation to be performed but the set of keys/parameters indicated by the profile of the given application user are not included in an attribute value associated with the given attribute in the log entry.

As another example, if the profile of a given application user indicates that the expected attribute value associated with a given attribute is a single expected attribute value, then the user anomaly detection component 183 may detect an anomaly if the application user attribute in a log entry indicates that the given application user caused a database operation to be performed but an attribute value associated with the given attribute in the log entry is not the single expected attribute value indicated by the profile of the given application user.

As another example, if the profile of a given application user indicates that the expected attribute value associated with a given attribute is one of multiple expected attribute values, then the user anomaly detection component 183 may detect an anomaly if the application user attribute in a log entry indicates that the given application user caused a database operation to be performed but an attribute value associated with the given attribute in the log entry is not one of the multiple expected attribute values indicated by the profile of the given application user.

As another example, if the profile of a given application user indicates that the expected attribute value associated with a given attribute is a numeric range of attribute values, then the user anomaly detection component 183 may detect an anomaly if the application user attribute in a log entry indicates that the given application user caused a database operation to be performed but an attribute value associated with the given attribute in the log entry does not fall within the numeric range of attribute values indicated by the profile of the given application user.

As another example, if the profile of a given function indicates that an attribute value associated with a given attribute is expected to exist, then the function anomaly detection component 187 may detect an anomaly if the function attribute in a log entry indicates that the given function caused a database operation to be performed but an attribute value associated with the given attribute indicated by the profile of the given function does not exist in the log entry.

As another example, if the profile of a given function indicates that a set of keys/parameters are expected to be included in an attribute value associated with a given attribute, then the function anomaly detection component 187 may detect an anomaly if the function attribute in a log entry indicates that the given function caused a database operation to be performed but the set of keys/parameters indicated by the profile of the given function are not included in an attribute value associated with the given attribute in the log entry. For example, assume that an application uses cookies X, Y and Z. Also, assume that requests to a certain URL of the application typically include cookie values for cookies X and Y but not for cookie Z. If a request to this URL includes cookies Z and Y but not X (according to an audit log 160B), then this can be considered an anomaly.

As another example, if the profile of a given function indicates that the expected attribute value associated with a given attribute is a single expected attribute value, then the function anomaly detection component 187 may detect an anomaly if the function attribute in a log entry indicates that the given function caused a database operation to be performed but an attribute value associated with the given attribute in the log entry is not the single expected attribute value indicated by the profile of the given function.

As another example, if the profile of a given function indicates that the expected attribute value associated with a given attribute is one of multiple expected attribute values, then the function anomaly detection component 187 may detect an anomaly if the function attribute in a log entry indicates that the given function caused a database operation to be performed but an attribute value associated with the given attribute in the log entry is not one of the multiple expected attribute values indicated by the profile of the given function.

As another example, if the profile of a given function indicates that the expected attribute value associated with a given attribute is a numeric range of attribute values, then the function anomaly detection component 187 may detect an anomaly if the function attribute in a log entry indicates that the given function caused a database operation to be performed but an attribute value associated with the given attribute in the log entry does not fall within the numeric range of attribute values indicated by the profile of the given function.

Thus, embodiments provide an effective framework for automatically detecting anomalies in audit logs. The framework allows for choosing one or more designated attributes (e.g., application user attribute and/or function attribute) and building profiles for attribute values associated with the designated attributes appearing in audit logs. The generated profiles can then be used to detect anomalies in subsequent audit logs. A technical advantage of the anomaly detection framework disclosed herein is that it allows anomaly detection to be performed from a chosen perspective or even multiple perspectives. For example, anomaly detection can be performed with respect to application user behavior (e.g., by setting the application user attribute as the designated attribute) and/or with respect to function behavior (e.g., by setting the function attribute as the designated attribute).

Figure 2:
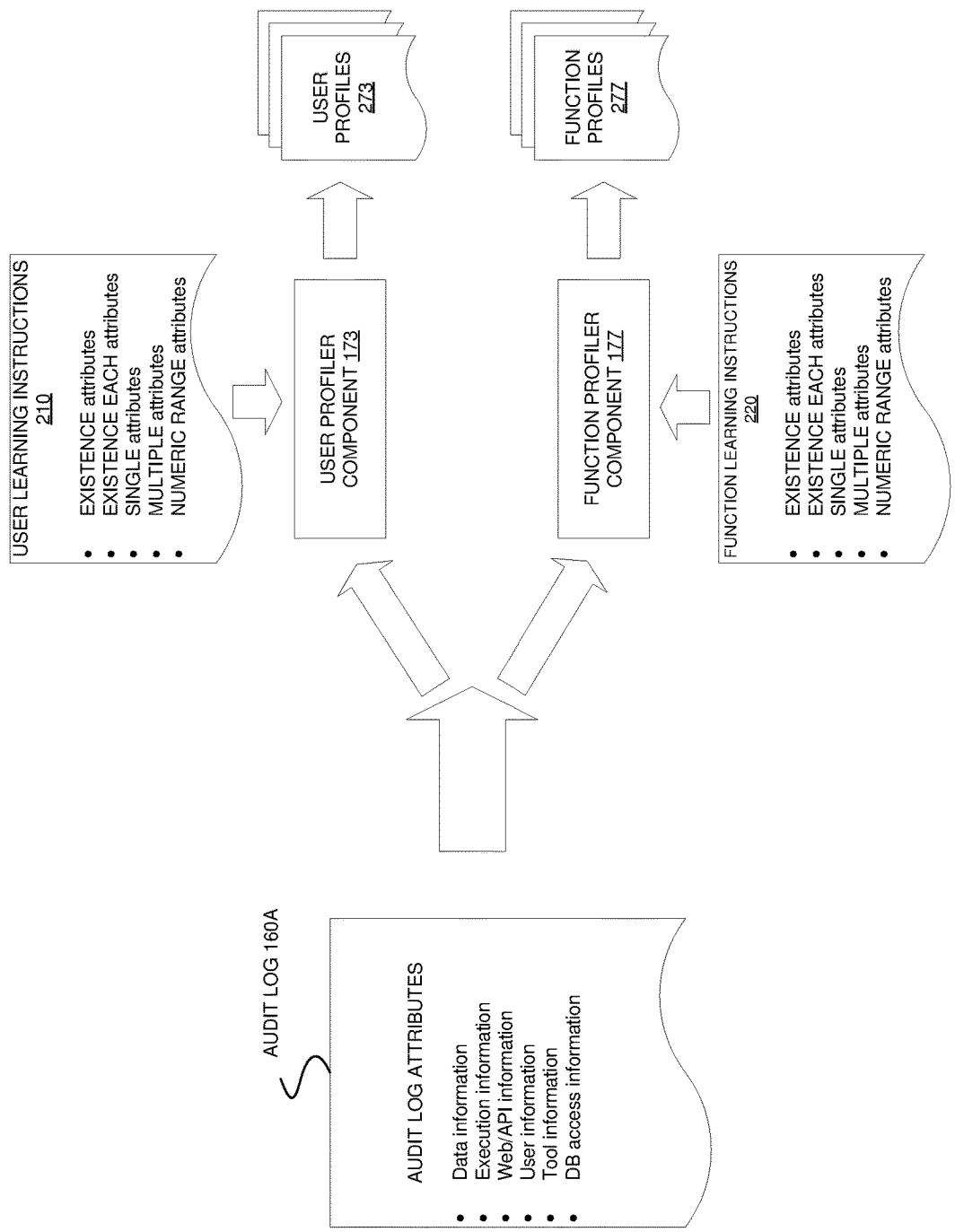
FIG. 2 is a diagram illustrating the inputs and outputs of the user profiler component and the function profiler component, according to some embodiments.

FIG. 2 is a diagram illustrating the inputs and outputs of the user profiler component and the function profiler component, according to some embodiments. The user profiler component 173 may receive as inputs audit log 160A and user learning instructions 210. Audit log 160A may include multiple log entries, where each log entry includes multiple attribute values associated with different attributes. The attributes in a log entry may include, for example, attributes related to data information (e.g., a data type attribute, a number of extracted entries attribute, a number of manipulated entries attribute, etc.), attributes related to execution information (e.g., a stack trace information attribute, a stack line attribute, etc.), attributes related to web/API information (e.g., a function/URL attribute, a params attribute, a headers attribute, a domain attribute, etc.), attributes related to user information (e.g., an application user attribute, a session info attribute, etc.), attributes related to tool information (e.g., a user-agent attribute, a tool classification attribute, etc.), and/or attributes related to database access information (e.g., a database attribute, a database table attribute, a database operation attribute, a database operation type attribute, a query attribute, etc.). The user learning instructions 210 indicate a learning type for each of one or more attributes other than the application user attribute. For example, the user learning instructions 210 may indicate attributes having an existence learning type (EXISTENCE attributes), attributes having an existence each learning type (EXISTENCE EACH attributes), attributes having a single learning type (SINGLE attributes), attributes having a multiple learning type (MULTIPLE attributes), and attributes having a numeric range learning type (NUMERIC RANGE attributes). The user profiler component 173 may use techniques described herein to generate profiles of application users (user profiles 273) as an output, which indicate expected attribute characteristics of one or more attributes (other than the application user attribute) when the respective application users are indicated by the application user attribute in a log entry as being the application user that caused a database operation to be performed.

The function profiler component 177 receives as input audit log 160A and function learning instructions 220. The function learning instructions 220 indicate a learning type for each of one or more attributes other than the function attribute. For example, the function learning instructions 220 may indicate attributes having an existence learning type (EXISTENCE attributes), attributes having an existence each learning type (EXISTENCE EACH attributes), attributes having a single learning type (SINGLE attributes), attributes having a multiple learning type (MULTIPLE attributes), and attributes having a numeric range learning type (NUMERIC RANGE attributes). The function profiler component 177 may techniques described herein to generate profiles of functions (function profiles 277) as an output, which indicate expected attribute characteristics of one or more attributes (other than the function attribute) when the respective functions are indicated by the function attribute in a log entry as being the function that caused a database operation to be performed.

Figure 3:
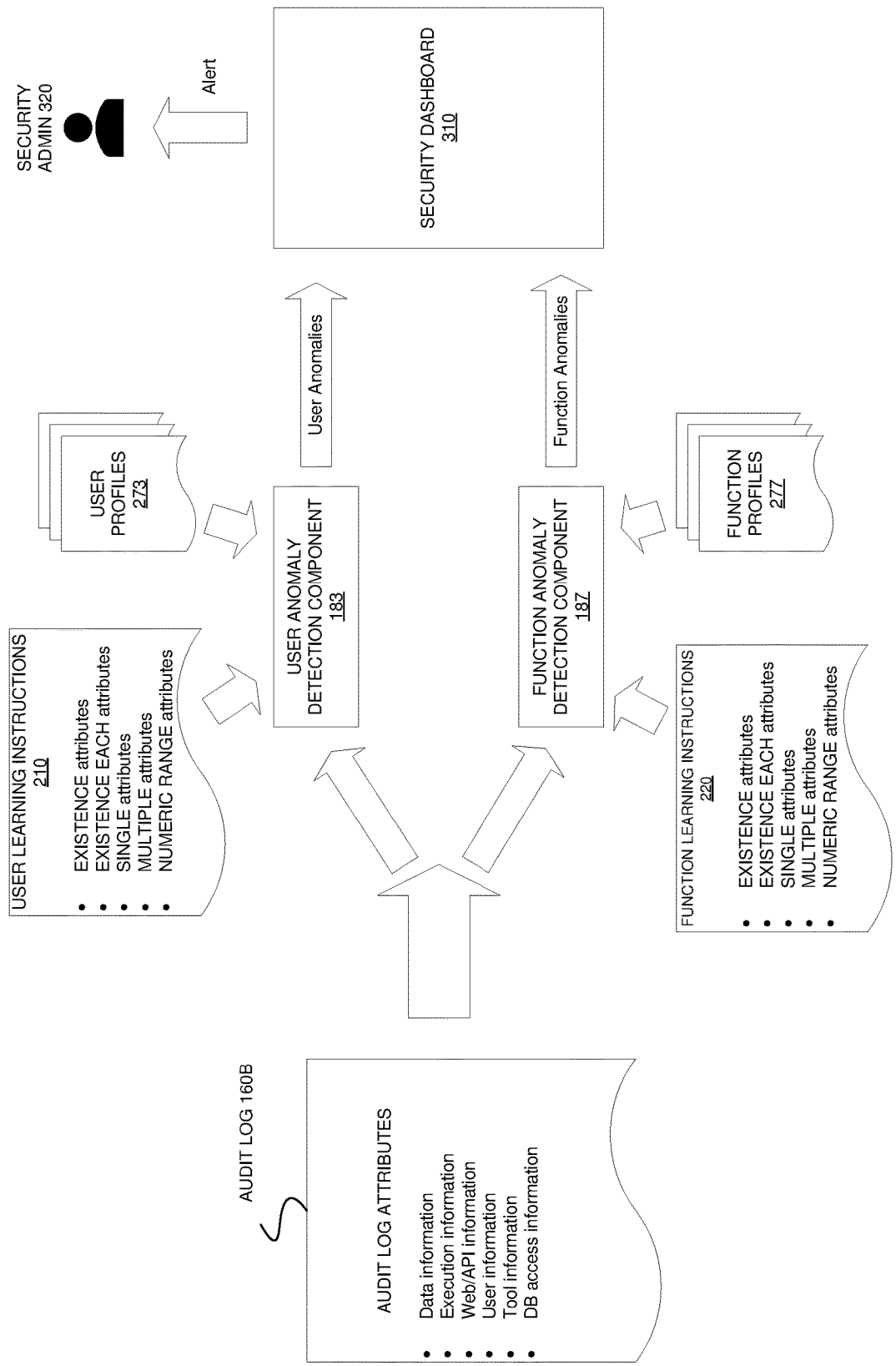
FIG. 3 is a diagram illustrating the inputs and outputs of the user anomaly detection component and the function anomaly detection component, according to some embodiments.

FIG. 3 is a diagram illustrating the inputs and outputs of the user anomaly detection component and the function anomaly detection component, according to some embodiments. As shown in the diagram, the user anomaly detection component 183 receive as inputs audit log 160B and user profiles 273. Audit log 160B may include similar attributes as audit log 160A described above with respect to FIG. 2. In one embodiment, the user anomaly detection component 183 also receives as input user learning instructions 210. The user anomaly detection component 183 may use the user profiles 273 (and possibly user learning instructions 210 (e.g., to determine the learning types for attributes so that they can be used to determine how to enforce the profiles)) to detect anomalies in audit log 160B. The user anomaly detection component 183 may report the detected user anomalies to a security dashboard 310, which can send an alert to a security administrator 320 regarding the detected user anomalies so that the security administrator 320 can take appropriate remedial actions.

As shown in the diagram, the function anomaly detection component 187 receives as inputs audit log 160B and function profiles 277. In one embodiment, the function anomaly detection component 187 also receives as input function learning instructions 220. The function anomaly detection component 187 may use the function profiles 277 (and possibly function learning instructions 220) to detect anomalies in audit log 160B. The function anomaly detection component 187 may report the detected anomalies to the security dashboard 310, which can send an alert to the security administrator 320 regarding the detected function anomalies so that the security administrator 320 can take appropriate remedial actions.

Figure 4:
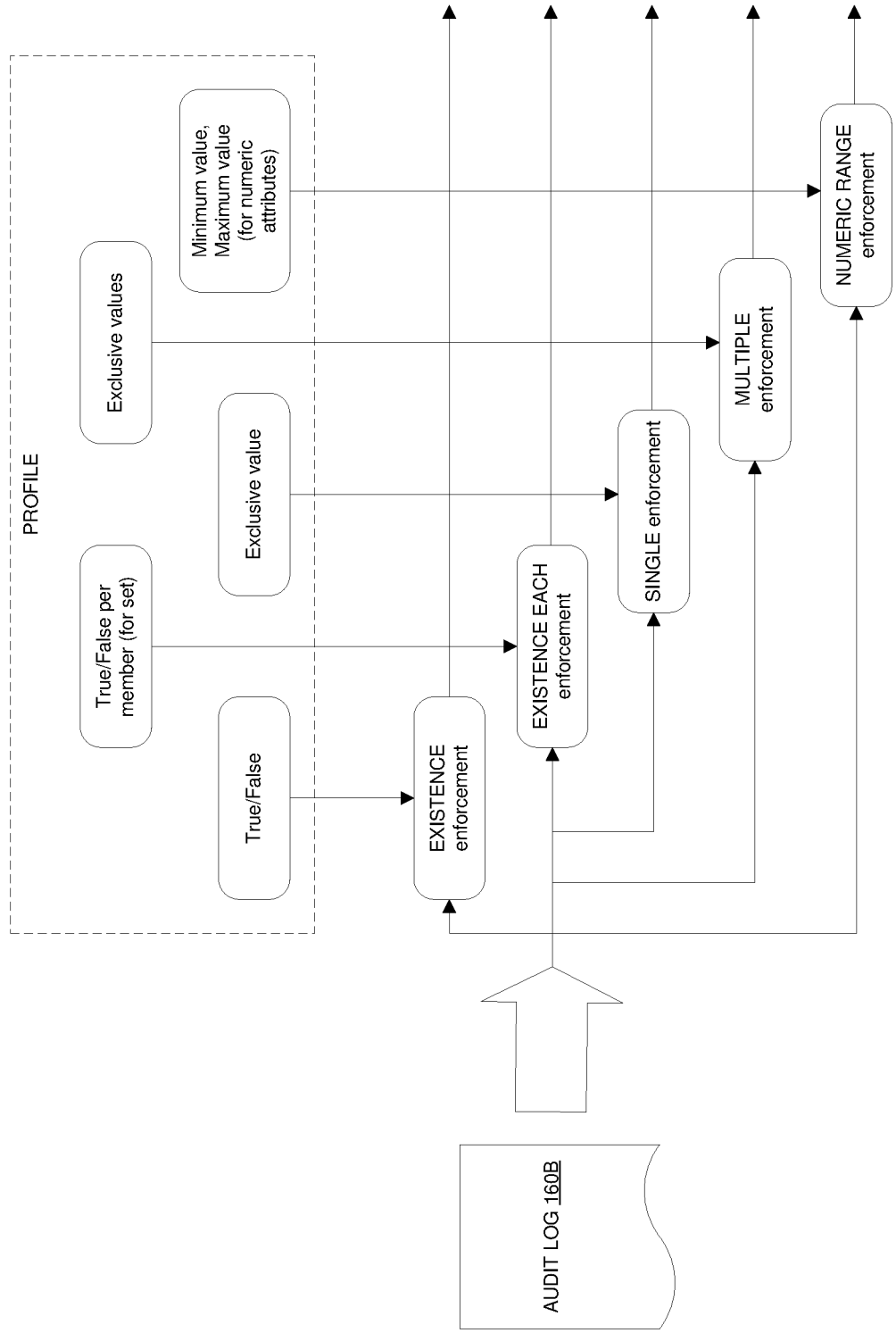
FIG. 4 is a diagram illustrating profile enforcement, according to some embodiments.

FIG. 4 is a diagram illustrating profile enforcement, according to some embodiments. As shown in the diagram, the profile of an attribute value may indicate whether an attribute value associated with a given attribute is expected to exist (true/false), indicate a set of keys/parameters that are expected to be included (and/or not included) in an attribute value associated with a given attribute (true/false per member (for a set)), a single attribute value expected to be associated with a given attribute (exclusive value), multiple attribute values that are expected to be associated with a given attribute (exclusive values), and a numeric range of attribute values expected to be associated with a given attribute (minimum value and maximum value (for numeric attributes)). The profile may be applied to audit log 160B to detect anomalies in audit log 160B. For example, if the profile of the attribute value indicates whether a given attribute is expected to exist, then an EXISTENCE enforcement can be applied to detect an anomaly depending on whether the given attribute exists or does not exist. If the profile of the attribute value indicates a set of keys/parameters that are expected to be included in a given attribute, then an EXISTENCE EACH enforcement can be applied to detect an anomaly if the set of keys/parameters indicated by the profile is not included in an attribute value associated with the given attribute. If the profile of the attribute value indicates a single attribute value expected to be associated with a given attribute, then a SINGLE enforcement can be applied to detect an anomaly if the attribute value associated with the given attribute deviates from the single attribute value indicated by the profile. If the profile of the attribute value indicates multiple attribute values that are expected to be associated with a given attribute, then a MULTIPLE enforcement can be applied to detect an anomaly if the attribute value associated with the given attribute is not one of the multiple attribute values indicated by the profile. If the profile indicates a numeric range of attribute values expected to be associated with a given attribute, then a NUMERIC RANGE enforcement can be applied to detect an anomaly if the attribute value associated with the given attribute falls outside of the numeric range of attribute values indicated by the profile.

Figure 5:
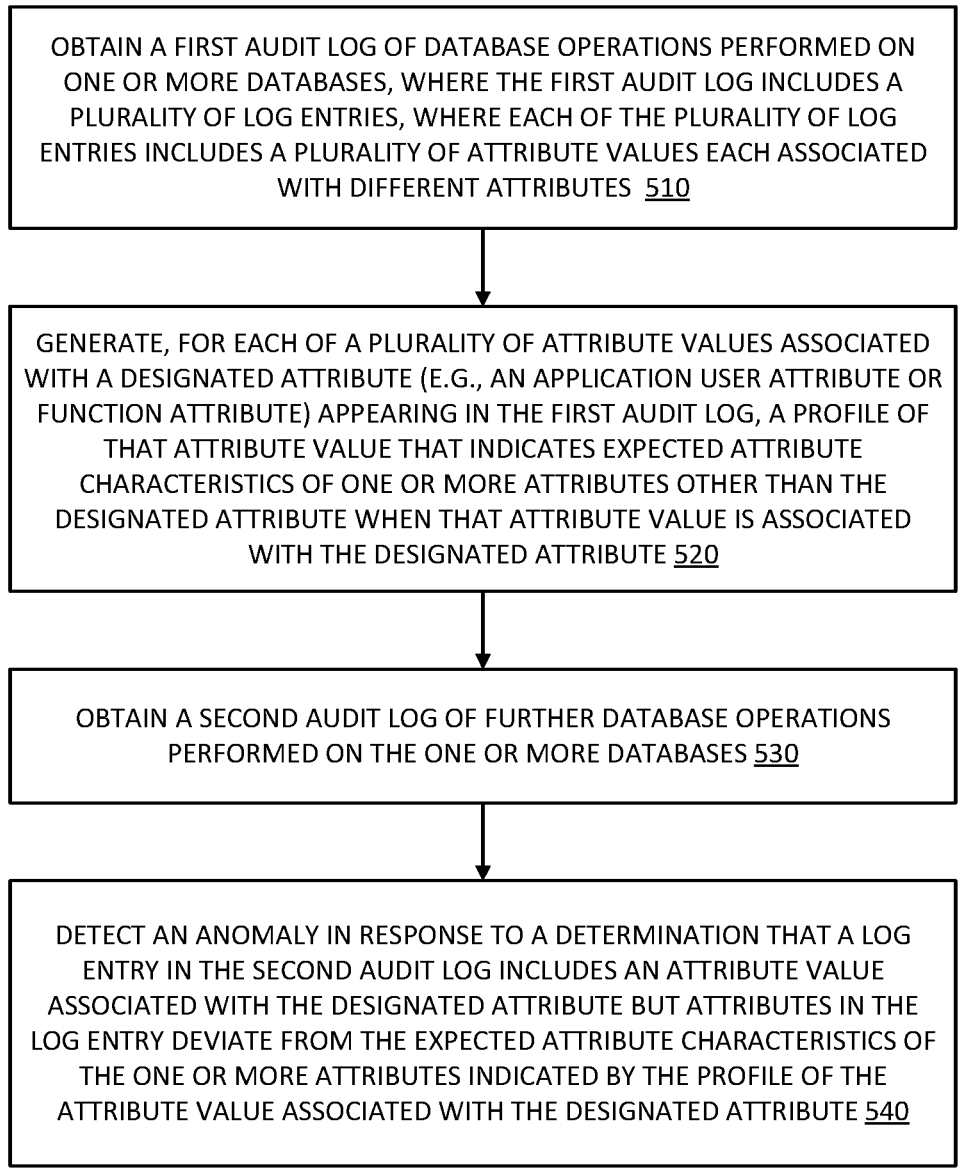
FIG. 5 is a flow diagram of a process for detecting anomalies in audit logs, according to some embodiments.

FIG. 5 is a flow diagram of a process for detecting anomalies in audit logs, according to some embodiments. In one embodiment, the process is performed by one or more computing devices (e.g., implementing a profiler component 170 and an anomaly detection component 180). The process may be implemented using any combination of hardware, software, and firmware. The operations in the flow diagram are described with reference to the exemplary embodiments of the other diagrams. However, it should be understood that the operations of the flow diagram can be performed by embodiments of the invention other than those discussed with reference to these other diagrams, and the embodiments of the invention discussed with reference to these other diagrams can perform operations different than those discussed with reference to the flow diagram. Also, while the flow diagram shows a particular order of operations performed by certain embodiments, it should be understood that such order is exemplary (e.g., alternative embodiments may perform the operations in a different order, combine certain operations, overlap certain operations, etc.).

At block 510, the one or more computing devices obtains a first audit log of database operations performed on one or more database, where the first audit log includes a plurality of log entries, where each of the plurality of log entries includes a plurality of attribute values associated with different attributes.

At block 520, the one or more computing devices generate, for each of a plurality of attribute values associated with a designated attribute appearing in the first audit log, a profile of that attribute value that indicates expected attribute characteristics of one or more attributes other than the designated attribute when that attribute value is associated with the designated attribute. In one embodiment, the designated attribute is an application user attribute, where the application user attribute is used for indicating an application user of an application that caused a database operation to be performed. In one embodiment, the designated attribute is a function attribute, where the function attribute is used for indicating a function of an application that caused a database operation to be performed. In one embodiment, the application is a web application, where the function of the application corresponds to a set of URLs that can be used to access the application.

In one embodiment, the expected attribute characteristics of the one or more attributes indicates an expected attribute value for a database name attribute or a database table name attribute, where the database name attribute is used for indicating a database on which a database operation was performed, and where the database table name attribute is used for indicating a database table on which a database operation was performed. In one embodiment, the expected attribute characteristics of the one or more attributes further indicates an expected attribute value for a database operation type attribute, where the database operation type attribute is used for indicating a type of database operation that was performed. In one embodiment, the expected attribute characteristics of the one or more attributes indicates an expected attribute value for a number of extracted entries attribute or a number of manipulated entries attribute, where the number of extracted entries attribute is used for indicating a number of entries extracted by a database operation, and where the number of manipulated entries attribute is used for indicating a number of entries manipulated by a database operation. In one embodiment, the expected attribute characteristics of the one or more attributes indicates an expected attribute value for an application user attribute, where the application user attribute is used for indicating an application user of an application that caused a database operation to be performed. In one embodiment, the expected attribute characteristics of the one or more attributes indicates an expected attribute value for a function attribute, wherein the function attribute is used for indicating a function of an application that caused a database operation to be performed. In one embodiment, the expected attribute characteristics of the one or more attributes indicates whether an attribute is expected to exist.

In one embodiment, the profiles of the plurality of attribute values associated with the designated attribute are generated based on learning instructions, where the learning instructions indicate a learning type for each of the one or more attributes. In one embodiment, the learning type of an attribute is one of: an existence learning type, an existence each learning type, a single learning type, a multiple learning type, and a numeric range learning type.

At block 530, the one or more computing devices obtain a second audit log of further database operations performed on the one or more databases.

At block 540, the one or more computing devices detect an anomaly in response to a determination that a log entry in the second audit log includes an attribute value associated with the designated attribute but attributes in the log entry deviate from the expected attribute characteristics of the one or more attributes indicated by the profile of the attribute value associated with the designated attribute.

Figure 6:
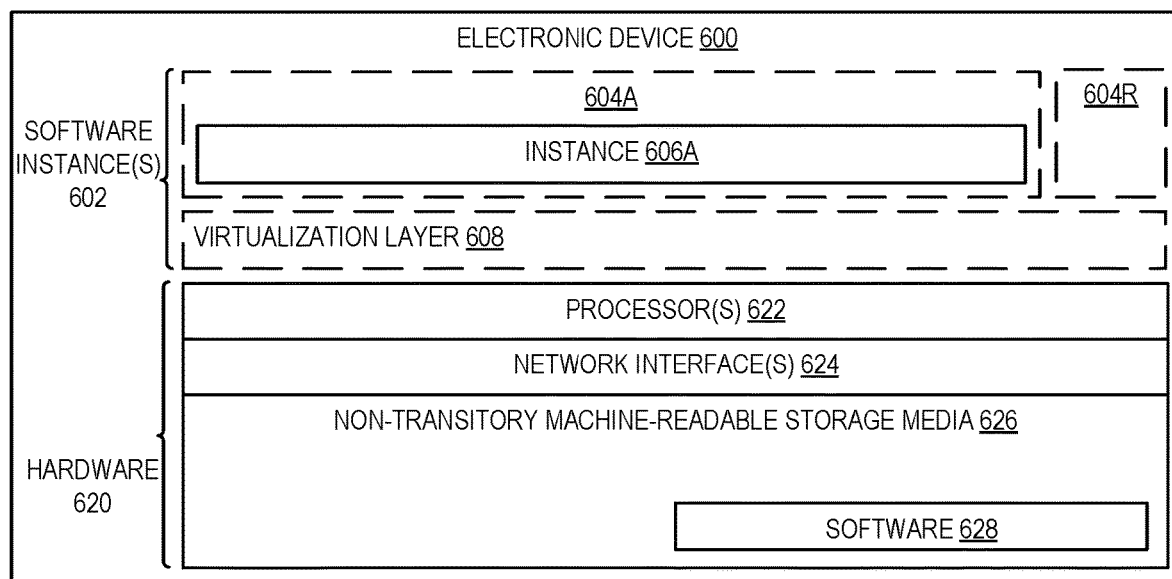
FIG. 6 is a block diagram illustrating an electronic device, according to some embodiments.

FIG. 6 is a block diagram illustrating an electronic device, according to some embodiments. FIG. 6 illustrates hardware 620 comprising a set of one or more processor(s) 622, a set of one or more network interfaces 624 (wireless and/or wired), and non-transitory machine-readable storage medium/media 626 having stored therein software 628 (which includes instructions executable by the set of one or more processor(s) 622). Software 628 can include code, which when executed by hardware 620, causes the electronic device 600 to perform operations of one or more embodiments described herein (e.g., operations for detecting anomalies in audit logs). The profiler component 170 and the anomaly detection component 180 may each be implemented by one or more electronic devices.

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more computing devices for detecting anomalies in audit logs of database operations performed on one or more databases, the method comprising:

obtaining a first audit log of database operations performed on the one or more databases, wherein the first audit log includes a plurality of log entries, wherein each of the plurality of log entries includes a plurality of attribute values each associated with different attributes;

generating, for each of a plurality of attribute values associated with a designated attribute appearing in the first audit log, a profile of that attribute value that indicates expected attribute characteristics of one or more attributes other than the designated attribute when that attribute value is associated with the designated attribute;

obtaining a second audit log of further database operations performed on the one or more databases; and detecting an anomaly in response to a determination that a log entry in the second audit log includes an attribute value associated with the designated attribute but attributes in the log entry deviate from the expected attribute characteristics of the one or more attributes indicated by the profile of the attribute value associated with the designated attribute.

2. The method of claim 1, wherein the profiles of the plurality of attribute values associated with the designated attribute are generated based on learning instructions, wherein the learning instructions indicate a learning type for each of the one or more attributes.

3. The method of claim 2, wherein the learning type of an attribute is one of: an existence learning type, an existence each learning type, a single learning type, a multiple learning type, and a numeric range learning type.

4. The method of claim 1, wherein the designated attribute is an application user attribute, wherein the application user attribute is used for indicating an application user of an application that caused a database operation to be performed.

5. The method of claim 1, wherein the designated attribute is a function attribute, wherein the function attribute is used for indicating a function of an application that caused a database operation to be performed.

6. The method of claim 5, wherein the application is a web application, and wherein the function of the application corresponds to a set of uniform resource locators (URLs) that can be used to access the application.

7. The method of claim 1, wherein the expected attribute characteristics of the one or more attributes indicate an expected attribute value for a database attribute or a database table name attribute, wherein the database attribute is used for indicating a database on which a database operation was performed, and wherein the database table name attribute is used for indicating a database table on which a database operation was performed.

8. The method of claim 1, wherein the expected attribute characteristics of the one or more attributes further indicate an expected attribute value for a database operation type attribute, wherein the database operation type attribute is used for indicating a type of database operation that was performed.

9. The method of claim 1, wherein the expected attribute characteristics of the one or more attributes indicate an expected attribute value for a number of extracted entries attribute or a number of manipulated entries attribute, wherein the number of extracted entries attribute is used for indicating a number of entries extracted by a database operation, and wherein the number of manipulated entries attribute is used for indicating a number of entries manipulated by a database operation.

10. The method of claim 1, wherein the expected attribute characteristics of the one or more attributes indicate an expected attribute value for an application user attribute, wherein the application user attribute is used for indicating an application user of an application that caused a database operation to be performed.

11. The method of claim 1, wherein the expected attribute characteristics of the one or more attributes indicate an expected attribute value for a function attribute, wherein the function attribute is used for indicating a function of an application that caused a database operation to be performed.

12. The method of claim 1, wherein the expected attribute characteristics of the one or more attributes indicate whether an attribute is expected to exist.

13. A set of one or more non-transitory machine-readable storage media storing instructions which, when executed by one or more processors of one or more computing devices, causes the one or more computing devices to perform operations for detecting anomalies in audit logs of database operations performed on one or more databases, the operations comprising:

obtaining a first audit log of database operations performed on the one or more databases, wherein the first audit log includes a plurality of log entries, wherein each of the plurality of log entries includes a plurality of attribute values each associated with different attributes;

generating, for each of a plurality of attribute values associated with a designated attribute appearing in the first audit log, a profile of that attribute value that indicates expected attribute characteristics of one or more attributes other than the designated attribute when that attribute value is associated with the designated attribute;

obtaining a second audit log of further database operations performed on the one or more databases; and detecting an anomaly in response to a determination that a log entry in the second audit log includes an attribute value associated with the designated attribute but attributes in the log entry deviate from the expected attribute characteristics of the one or more attributes indicated by the profile of the attribute value associated with the designated attribute.

14. The set of one or more non-transitory machine-readable storage media of claim 13, wherein the profiles of the plurality of attribute values associated with the designated attribute are generated based on learning instructions, wherein the learning instructions indicate a learning type for each of the one or more attributes.

15. The set of one or more non-transitory machine-readable storage media of claim 13, wherein the designated attribute is an application user attribute, wherein the application user attribute is used for indicating an application user of an application that caused a database operation to be performed.

16. The set of one or more non-transitory machine-readable storage media of claim 13, wherein the designated attribute is a function attribute, wherein the function attribute is used for indicating a function of an application that caused a database operation to be performed.

17. A computing device configured to detect anomalies in audit logs of database operations performed on one or more databases, the computing device comprising:

one or more processors; and a non-transitory machine-readable storage medium having instructions stored therein, which when executed by the one or more processors, causes the computing device to:

obtain a first audit log of database operations performed on the one or more databases, wherein the first audit log includes a plurality of log entries, wherein each of the plurality of log entries includes a plurality of attribute values each associated with different attributes, generate, for each of a plurality of attribute values associated with a designated attribute appearing in the first audit log, a profile of that attribute value that indicates expected attribute characteristics of one or more attributes other than the designated attribute when that attribute value is associated with the designated attribute, obtain a second audit log of further database operations performed on the one or more databases, and detect an anomaly in response to a determination that a log entry in the second audit log includes an attribute value associated with the designated attribute but attributes in the log entry deviate from the expected attribute characteristics of the one or more attributes indicated by the profile of the attribute value associated with the designated attribute.

18. The computing device of claim 17, wherein the profiles of the plurality of attribute values associated with the designated attribute are generated based on learning instructions, wherein the learning instructions indicate a learning type for each of the one or more attributes.

19. The computing device of claim 17, wherein the designated attribute is an application user attribute, wherein the application user attribute is used for indicating an application user of an application that caused a database operation to be performed.

20. The computing device of claim 17, wherein the designated attribute is a function attribute, wherein the function attribute is used for indicating a function of an application that caused a database operation to be performed.

* * * * *